No. 862,179. PATENTED AUG. 6, 1907.
W. F. MIKOLASEK.
EGG TESTER.
APPLICATION FILED SEPT. 15, 1906.
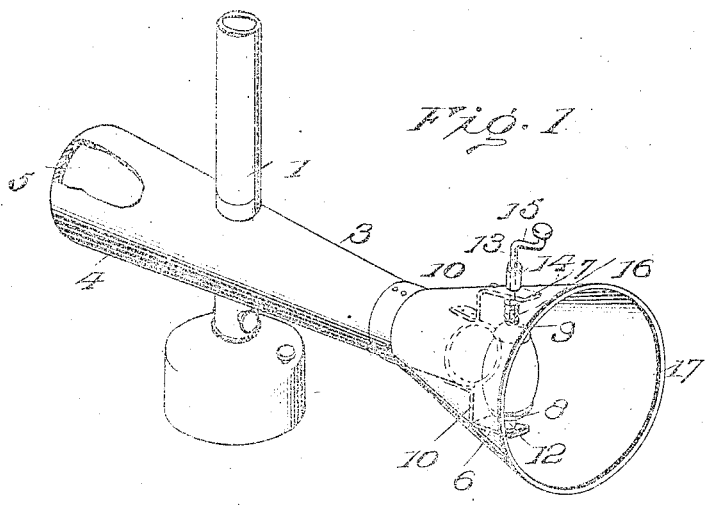
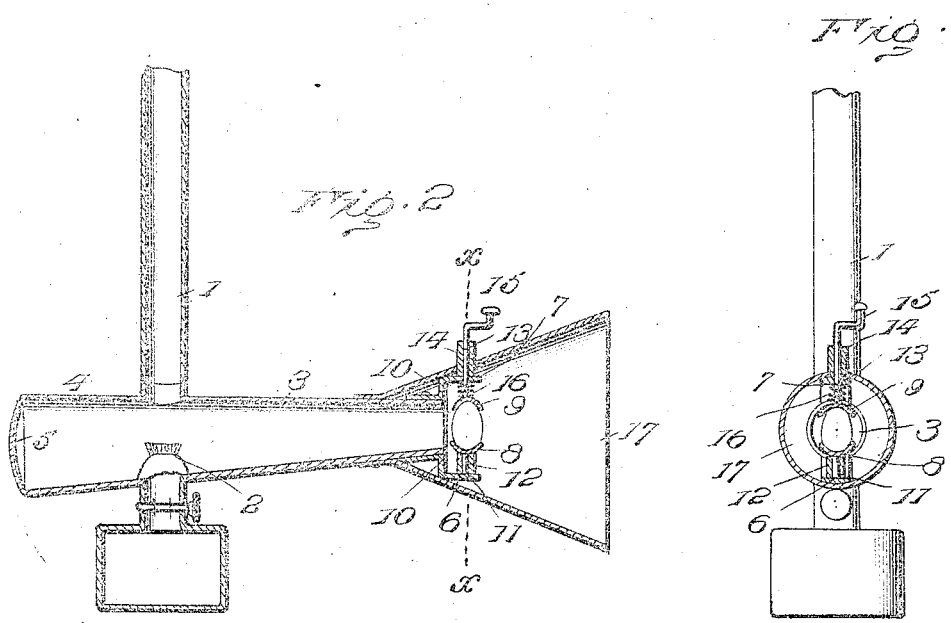
Witnesses
Inventor
W. F. Mikolasek
By
Attorneys

UNITED STATES PATENT OFFICE.

WENCESLAUS F. MIKOLASEK, OF VODNANY, SOUTH DAKOTA.

EGG-TESTER.

No. 862,179.  Specification of Letters Patent.  Patented Aug. 6, 1907.

Application filed September 15, 1906. Serial No. 334,708.

*To all whom it may concern:*

Be it known that I, WENCESLAUS F. MIKOLASEK, a subject of the Emperor of Austria, and residing at Vodnany, in the county of Bonhomme and State of South Dakota, have invented certain new and useful Improvements in Egg-Testers, of which the following is a specification.

This invention relates to improvements in egg testers of that type in which the egg is held against any suitable source of light supply in order to inspect its translucency, a muddy or cloudy appearance indicating deterioration.

The object of the invention is to so construct the apparatus as to obviate the necessity of conducting the testing operation in a dark room, and also to provide means whereby the egg can be readily supported and rotated so as to be observed from all sides.

For a full understanding of the invention and the merits thereof and also to acquire a knowledge of the details of construction of the means for effecting the result, reference is to be had to the following description and accompanying drawings, in which:

Figure 1 is a perspective view of the improved egg tester, portions being broken away; Fig. 2 is a longitudinal sectional view through the same; and, Fig. 3 is a transverse sectional view on the line *x—x* of Fig. 2.

Corresponding and like parts are referred to in the following description and indicated in all the views of the drawings by the same reference characters.

The numeral 1 designates the body or casing of the egg tester which may be of any suitable shape and is shown in the present instance as being cylindrical. This casing 1 is designed to inclose any suitable source of light supply such as indicated at 2. Projecting laterally from one side of the casing 1 is a tube 3 which is preferably slightly contracted toward its outer end and forms the aperture through which the egg being tested is viewed. Projecting laterally from the opposite sides of the casing 1 and in alinement with the above mentioned tube 3 is a second tube 4, the outer end of which is provided with a reflector 5 by means of which the light passing through the tube 3 is intensified so as to enable the eggs to be quickly and thoroughly tested. A pair of spring arms 6 and 7 project outwardly from opposite sides of the extremity of the tube 3 and carry the cup shaped members 8 and 9 between which the egg is held.

As shown in the drawings, each of the arms 6 and 7 is formed with an offset portion 10 by means of which their extremities are thrown apart, so that their outer ends, which carry the cup shaped members 8 and 9 will lie entirely outside of the margin of the contracted ends of the tube 3. The lower cup 8 is provided with a stub shaft 11 which is journaled within a sleeve 12 projecting from the extremity of the arm 6. The upper cup shaped member 9 is carried by a shaft 13 which passes loosely through a sleeve 14 projecting from the arm 7, and is provided at its extremity with a crank 15. Interposed between this upper cup 9 and the arm 7 is a coil spring 16 which surrounds the shaft 13 and operates to force the cup into a close engagement with the egg. In order to prevent any injury to the eggs while being tested, each of the cups 8 and 9 is preferably lined with some soft material, such as felt. With this construction, it will be apparent that when the shaft 13 is pulled upwardly, the eggs can be readily placed in position between the two cups 8 and 9, and the spring 16 will cause the cups to grip the egg when the shaft is released. The egg can then be revolved through the medium of the crank 15 and viewed from all sides. The hood 17 which shuts off the external light from the egg enables the testing operation to be conducted in the light and is in the nature of a conical projection at the outer end of the tube 3. Any suitable material such as sheet metal may be employed in the construction of the hood 17 and the inner face of the hood is preferably blackened so as to counteract to as great an extent as possible the effects of the external light.

Having thus described the invention, what is claimed as new is:

An egg tester, comprising a casing adapted to contain a source of light, tubes 3 and 4 intersecting said casing coincident with the source of light and extending from opposite directions thereof, one tube being provided at its outer end with a reflector, and the two tubes tapering from said reflector towards the outer end of the other tube, a conical hood having its smaller end surrounding and secured to the smaller end of the tube 3 and projecting outwardly beyond said end, arms 6 and 7 secured to the said end of the tube 3 within the said hood, the said arms being offset outwardly and the said offset portions being located entirely without the margin of the smaller end of the tube 3, and means secured to the offset portions of said arms, for holding an egg within the hood and in registry with the smaller end of said tube 3, as and for the purpose set forth.

In testimony whereof I affix my signature in presence of two witnesses.

WENCESLAUS F. MIKOLASEK. [L. S.]

Witnesses:
JAMES A. WAGNER,
E. A. BOUSKA.